United States Patent [19]

Ushioda et al.

[11] Patent Number: 4,907,735

[45] Date of Patent: Mar. 13, 1990

[54] PROCESS FOR PRODUCING A CHASSIS FOR VEHICLES

[75] Inventors: Shunta Ushioda, Yukishi; Ichizo Tsukuda, Osaka; Noboru Ohneda; Minobu Sukimoto, both of Oyamashi, all of Japan

[73] Assignee: Showa Aluminum Kabushiki Kaisha, Osaka, Japan

[21] Appl. No.: 420,634

[22] Filed: Oct. 5, 1989

Related U.S. Application Data

[63] Continuation of Ser. No. 230,175, Aug. 9, 1988, abandoned.

[30] Foreign Application Priority Data

Aug. 11, 1988 [JP] Japan .................................. 62-201423

[51] Int. Cl.⁴ .............................................. B60R 21/13
[52] U.S. Cl. ............................... 228/173.4; 29/897.2; 280/790; 280/798; 280/800
[58] Field of Search ............... 280/781, 786, 790, 798, 280/800; 29/155 R, 557, 558; 228/164, 170, 173.1, 173.4, 157, 159

[56] References Cited

U.S. PATENT DOCUMENTS

| | | | |
|---|---|---|---|
| 2,139,788 | 12/1938 | Woolson | 29/155 R |
| 2,277,616 | 3/1942 | Townsend | 280/790 |
| 3,022,846 | 2/1962 | Thompson | 280/798 |
| 3,034,197 | 5/1962 | Watanabe | 29/155 R |
| 3,104,454 | 9/1963 | Handley et al. | 29/155 R |
| 3,129,493 | 4/1964 | Grubb | 29/155 R |
| 3,737,964 | 6/1973 | Jury | 29/155 R |
| 4,732,819 | 3/1988 | Komuro | 280/798 |

FOREIGN PATENT DOCUMENTS 2370618 7/1978 France .................................. 280/781

OTHER PUBLICATIONS

Metals Handbook Ninth Edition, vol. 2, pp. 4, 5, 18, 19, Copyright 1979.

*Primary Examiner*—Richard K. Seidel
*Assistant Examiner*—Samuel M. Heinrich

[57] ABSTRACT

A process for producing a chassis for vehicles, which includes the steps of fabricating a single frame element of aluminum alloy, the frame element having an upper beam, a lower beam and a web portion connecting between the two beams, removing some of the web portion to a desired length, pulling the upper beam and lower beam of the web vacant portion in opposite directions so that the web vacant portion becomes an expanded opening, bending the frame element in accordance with the size and shape of the body of a vehicle to be placed on the chassis, and welding the terminating ends of the frame element to form an endless frame.

4 Claims, 1 Drawing Sheet

PROCESS FOR PRODUCING A CHASSIS FOR VEHICLES

This application is a continuation of application Ser. No. 230,175, filed August 9, 1988, now abandoned.

BACKGROUND AND SUMMARY OF THE INVENTION

The present invention relates to a process for producing a chassis for holding the body and engine of an automotive vehicle, and more particularly, to a process for producing such chassis of aluminum. The aluminum herein includes pure aluminum and aluminum alloys.

There are many kinds of chassis known in the art, but in common with them, they comprise a frame made of steel bars welded to each other. The known process consists of several steps starting with the framing of steel bars and ending with the welding of them. Thus the process is time- and labor-consuming, which reflects in the production cost. Another disadvantage is that the steel frame is heavy, which is contrary to the modern trend of lightweight vehicles. In addition, the frame has many welded seams, which are liable to fracture during use.

In line with the modern demand for lightweight vehicles there are various proposals among which is a chassisless or a monocoque. The chassisless may be effective for some types of vehicles; however, for other types requiring a rigid body a chassis is nevertheless indispensable.

One proposal for lightweight vehicles is to use a chassis made of light material such as aluminum and plastic. Nevertheless, plastic is at a premature stage for use in chassis, and aluminum is considered as a last resort to achieve chassis in the age of lightweight vehicles. It has been found, however, that the mere substitution of aluminum for steel does not solve the problem, and that there should be a new process for using aluminum instead of steel.

The present invention is to provide a process adapted for producing chassis of aluminum which overcomes the difficulties arising from the substitution of aluminum for steel.

Other objects and advantages of the present invention will become more apparent from the following detailed description, when taken in conjunction with the accompanying drawings which show, for the purpose of illustration only, one embodiment in accordance with the present invention.

According to the present invention, there is provided a process for producing a chassis for vehicles, the process including the steps of fabricating a single frame element of aluminum alloy, the frame element having an upper beam, a lower beam and a web portion connecting between the two beams, removing some of the web portion to a desired length, pulling the upper beam and lower beam of the web vacant portion in opposite directions so that the web vacant portion becomes an expanded opening, bending the frame element in accordance with the size and shape of the body of a vehicle to be placed on the chassis, and welding the terminating ends of the frame element to form an endless frame.

DETAILED DESCRIPTION OF THE INVENTION

Figure 1:
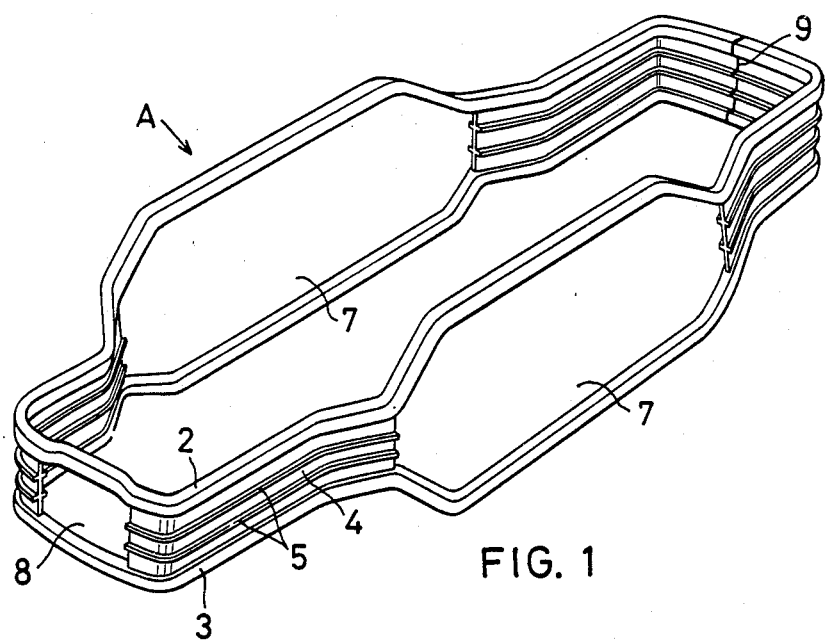
FIG. 1 is a perspective view showing a chassis produced according to the present invention.

FIG. 1 shows a finished chassis (A) comprising a frame element 1, which is obtained by extruding aluminum alloy through an extruding machine. The aluminum alloy is preferably A6000 alloy, such as 6NO1, which includes Al, Mg and Si. This type of alloy has advantages of being extrusive, tough, workable and weldable, and anti-corrosive.

As shown in FIG. 1, the frame element 1 has an upper beam 2, a lower beam 3, and a web portion 4 connecting between the two beams 2 and 3. The web portion 4 can be reinforced with a rib; in the illustrated embodiment two ribs are provided on each side of the web portion 4. Preferably, the both means 2, 3 are hollow, having passages 2a and 3a, respectively. These passages 2a and 3a can be used to accommodate wires or cords provided for the vehicle. FIG. 3 shows a modified frame element whose lower beam 13 is defferent in shape from that of FIG. 2, in that the web portion 4 is passed through the lower beam 13 until it reaches the bottom thereof, and that the outside of the lower beam 13 is slightly curved to enhance its ornamentality. The frame element 1 can be reinforced by embedding piano wires or the like therein.

The frame element 1 is preferably made of a $T_4$ homogenized aluminum alloy which is hardened by natural ageing after a homogenizing treatment, or a $T_1$ homogenized aluminum alloy which is hardened by natural ageing after the starting material is extruded.

Figure 2:
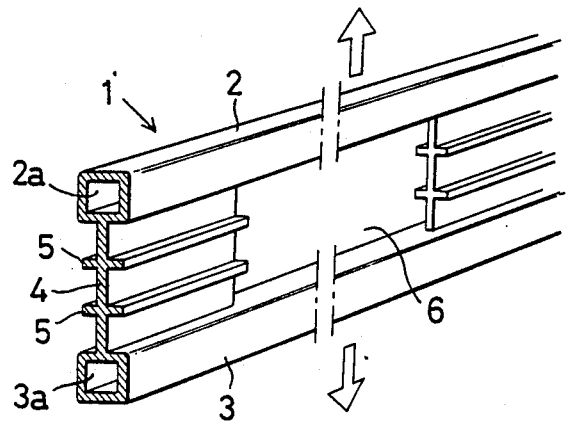
FIG. 2 is a perspective view on a larger scale showing a part of the frame element having some of the web portion removed.
Figure 3:
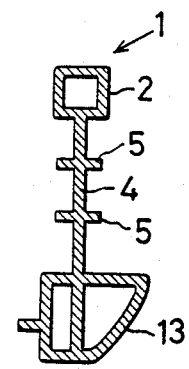
FIG. 3 is a cross-section through a modified version of the frame element.

As shown in FIG. 1 the frame element 1 has expanded openings or windows 7 and 8, which are formed as follows:

Some of the web portions 4 are removed at 6 as shown in FIG. 2. The size and shape of the removed portions 6 are determined in accordance with those of the body of the vehicle to be placed on the chassis. Then the upper beam 2 and the lower beam 3 of this portions 6 are pulled in opposite directions as shown by the arrows in FIG. 2 so that the removed portions 6 are expanded into larger openings. The windows 7 are larger in area than the window 8, the windows 7 and 8 being used for locating the doors, the windows and radiator grill of the vehicle when the body of the vehicle is placed on the chassis (A).

Subsequently the frame element 1 is bent in accordance with the size and shape of the body of a vehicle. FIG. 1 shows one example of the shape. The terminating ends are welded to form a welded seam 9. Thus the frame element 1 constitutes the chassis (A). If necessary, the chassis (A) is subjected to an ageing treatment, and is provided with a reinforcement to the extent that the aim of a lightweight chassis is not negated.

As is evident from the foregoing, the present invention reduces the number of manufacturing steps, thereby minimizing the time and labor consumption. This leads to a reduced production cost. The aluminum chassis contributes to the achievement of lighweight vehicle. When the body of a vehicle is made of aluminum, the aluminum chassis is particularly advantageous in that the chassis is more easily welded to the aluminum body and the anti-electrolytic corrosive property is more enhanced than between the aluminum chassis and the steel body. The chassis has only one welded seam, thereby securing a robust structure as compared with the known chassis having a number of weled seams.

What is claimed is:

1. A process for producing a chassis for vehicles, the process comprising: extruding a single frame element from an aluminum alloy, the frame element having a continuous cross-section and including an upper beam, a lower beam, and a web portion disposed between the two beams and connecting the two beams; removing substantially all of the web portion along a predetermined length of the beam to define a vacant portion of the web; pulling the upper beam and lower beam of the web vacant portion in opposite directions so that the web vacant portion becomes an expanded opening; bending the frame element in accordance with the size and shape of the body of a vehicle which is to be placed on the chassis; and welding the ends of the frame element into an endless frame.

2. A process as defined in claim 1, wherein the upper beam and the lower beam are hollow throughout their lengths.

3. A process as defined in claim 1 or 2, wherein the frame element is made of A6000 aluminum alloy.

4. A process as defined in claim 1 or 2, wherein the web portion is provided with reinforcing ribs.

* * * * *